United States Patent [19]

Van Zeggeren

[11] Patent Number: 5,070,697
[45] Date of Patent: Dec. 10, 1991

[54] ACTUATOR WITH MEMORY METAL AND A SHOCK ABSORBER PROVIDED WITH THIS ACTUATOR

[75] Inventor: Wilhelm A. Van Zeggeren, Bleiswijk, Netherlands

[73] Assignee: Koni, Beijerland, Netherlands

[21] Appl. No.: 582,951

[22] PCT Filed: Apr. 12, 1989

[86] PCT No.: PCT/NL89/00021
§ 371 Date: Sep. 25, 1990
§ 102(e) Date: Sep. 25, 1990

[87] PCT Pub. No.: WO89/09880
PCT Pub. Date: Oct. 19, 1989

[30] Foreign Application Priority Data

Apr. 12, 1988 [NL] Netherlands .............. 8800944

[51] Int. Cl.⁵ ............................... F03G 7/06
[52] U.S. Cl. ...................... 60/527; 188/299; 188/313
[58] Field of Search ............. 60/527, 528, 529; 188/297, 299, 300, 313, 314

[56] References Cited
U.S. PATENT DOCUMENTS
4,187,683 2/1980 Northrop et al. .................. 60/527

Primary Examiner—Allen M. Ostrager
Attorney, Agent, or Firm—Robert P. Seitter; J. Gordon Lewis

[57] ABSTRACT

An actuator (1) in particular for proportionally influencing the fluid flow in hydraulic and/or pneumatic devices, including a cylindrical housing (2) with an elongated actuating element (3) movably supported therein, elements (11, 12, 13) of memory metal, engaging said actuating element (3), the housing (2) and the actuating element (3) movable relative to one another by activation of the elements (11, 12, 13) of memory metal, if necessary against the force exerted by an element (15) of permanent resilient material. The housing (2) is provided at one end (8) with an opening (9) through which the actuating element (3) protrudes longitudinally upon relative movement. Bringing about the intended proportional operation, the actuator (1) includes locking means (16, 17, 19), engaging the actuating element (3), for mutually locking the actuating element (3) and their housing (2) in one or more positions. The locking means comprise preferably at least one element (16) of memory metal, by activation of which the mutual locking of the actuating element (3) and the housing (2) can be controlled. Further, there is provided a shock absorber comprising an actuator.

20 Claims, 3 Drawing Sheets

ACTUATOR WITH MEMORY METAL AND A SHOCK ABSORBER PROVIDED WITH THIS ACTUATOR

INTRODUCTION

The invention relates to an actuator comprising a cylindrical housing with an elongated actuating element movably supported therein, and an element of memory metal engaging said acuating element, the housing and the actuating element being movable relative to one another by activation of the element of memory metal and the housing being provided at one end with at least one opening through which the actuating element protrudes longitudinally upon said relative movement.

BACKGROUND OF THE INVENTION

An actuator of this type is known from Japanese Patent 59,206,682.

The term memory metal is used to define a metal alloy or a group of metal alloys which have the characteristic that after the metal has acquired a certain shape at a suitable temperature it always returns spontaneously to this shape on heating above a certain transition temperature, the so-called shape recovery behaviour. Below this transition temperature, the memory metal is apparently plastically deformable. The transition temperature and a hysteresis region around the transition temperature are determined by the composition of the alloy. As a consequence of the good controllability and the unlimited repeatability of the shape recovery behaviour and because of the relatively sharply restricted transition temperature, these alloys are used for thermal transducers and for converters of thermal energy to mechanical energy. The alloy for which there is most interest are CuZnAl, CuAlNi and TiNi, the latter alloy also being termed Nitinol.

In the actuator disclosed in JP-A-59,206,682 the distance over which the housing and the actuating element can be moved relative to one another can be predetermined via an assembly of two compression springs and an adjusting screw. When this known actuator is used in hydraulic or pneumatic devices, the fluid flow in a system of channels in these devices can be influenced only in a predetermined manner, in accordance with the on/off principle. The set fluid control can be changed only by changing the relative distance of movement of the housing and the actuating element by means of the adjusting screw, for example manually. The assembly of the two compression springs acting on the actuating element also has an adverse influence on the response speed of the actuator.

As a consequence of the spontaneous shape recovery behaviour, the memory metal in itself possesses only the characteristics of an on/off control. In practice, however, there is also need for electrically operated actuators with which proportionally the magnitude of the fluid flow in one or more channels of such a system of channels can be controlled.

BRIEF DESCRIPTION OF THE INVENTION

The aim of the invention is to provide an actuator of the type mentioned in the preamble which is universally applicable for influencing fluid or gas flows in a hydraulic and/or pneumatic system proportionally and with a desired response speed while maintaining the advantages of the use of memory metal.

For the purpose the invention is characterized in that the actuator is provided with locking means engaging the actuating element for mutually locking the actuating element and the housing in one or more positions, in particular for proportionally influencing the fluid flow in hydraulic and/or pneumatic devices.

Compared with the known actuator, in the embodiment according to the invention the distance over which the housing and the actuating element can be moved relative to one another can be set with the aid of the locking means without influencing the response speed. Consequently, for example, in the case of a fixed housing the actuating element can thus be moved under the influence of the element of memory metal to a position outside the housing and, by means of the locking means engaging this element, locked proportionally and discontinuously in one or more positions, the actuator being able, for example, to operate a flap or shut-off valve with which the fluid flow in a system of channels is controlled. On the other hand, the actuating element can be fixed and the housing being movable.

By using memory metal as a thermomechanical converter for providing the mechanical kinetic force, the actuator according to the invention can be kept of relatively small dimensions compared with proportional actuators operated by electromechanical converters such as electromotors or relays, a shorter response time than with actuators driven by electromechanical converters also being achieved. This latter feature is of importance in particular in those pneumatic or hydraulic systems in which it has to be possible to control the fluid flow instantaneously.

A further embodiment of the actuator according to the invention is characterized in that the locking means comprise at least one element of memory metal, by activation of which the mutual locking of actuating element and housing can be controlled. The use of memory metal in the locking means has the advantage that a controllable locking can be provided in a relatively simple and compact manner by activation of the at least one element of memory metal.

Two characterizing principles can be differentiated here, i.e. the at least one element of memory metal itself directly engages the actuating element, or the at least one element of memory metal operates a locking element which in turn engages the actuating element.

An embodiment based on the first mentioned principle, in which the at least one element of memory metal is designed a locking element, is characterized in that the at least one locking element consists of a loop of memory metal surrounding the actuating element, such that on heating the metal above its transition temperature the loop attempts to presume a predetermined diameter. Since the actuating element according to a further embodiment of the invention is provided with at least one notch into which the at least one locking element can grip, the actuating element can effectively be locked in at least one defined position.

An embodiment for locking the actuating element and housing constructed in accordance with the second principle mentioned is characterized in that the at least one element of memory metal, which belongs to the locking means, is constructed as an element with a spring action and can act in concert with a further locking element of the locking means in such a way that the further locking element is controlled by activation of this element.

A further embodiment of the actuator according to the invention based on this second principle is characterized in that the further locking element consists of at least one elongated body having projections protruding into the housing, onto which body several elements, designed as a spring, of memory metal grip for moving the body in the radial direction of the housing, it being possible to lock the actuating element in a specific position by means of the said projections and disc-shaped elements, connected to the actuating element which grip these projections.

The element of memory metal, under the influence of which the housing and the actuating element can be moved relative to one another, can assume various forms such as, inter alia, that of a spring which on heating above its transition temperature attempts to assume a predetermined length as a consequence of the memory effect. Yet a further embodiment of the invention is characterized in that the element of memory metal is made up of several springs which are connected in a cascade and can be activated separately. The distance over which the actuating element can protrude outside its housing can, in addition to the locking means, in this case also be varied by activating more or less springs.

It will be clear that the number of adjustment possibilities of the actuator can be appreciable by this means, so that this device can be used in a wide field of desired control layouts. The use of several elements of memory metal connected in cascade can also be advantageous with regard to the response speed of the actuator. This is because, for a given actuation, a relatively small element of memory metal can be heated more rapidly to above the transition temperature than a physically larger element of which only part of the movement achievable by this means is used for the desired instantaneous adjustment of the actuator.

When, for example, the actuator operates a flap which closes under spring force, no separate means are needed to bring actuating element or the housing back into the original position after locking is removed. When, on the other hand, the actuator according to the invention must intervene directly with a fluid flow, for which purpose the actuating element itself or the housing can be provided with suitable means, it is necessary to provide means for resetting the actuator.

Yet a further embodiment of the actuator according to the invention is characterized for this purpose in that the actuator comprises at least one further element of permanently resilient material which engages on the actuating element and under the influence of which the housing and the actuating element can be moved relative to one another in a direction opposite to the relative direction of movement provided by the element of memory metal, which at least one element is designed as a compression spring.

On the assumption that the actuating element can be moved by the at least one element of memory metal in the direction out of the housing, the spring force of the at least one further element acts on the actuating element in the direction towards the housing. When the actuation of the element of memory metal is cancelled, the actuating element protruding outside the housing will, provided it is not locked, be brought back into the housing again by the one further element. In the case where the actuating element is moved by the element of memory metal in the direction towards the housing, the at least one further element acts on the actuating element in such a way that it can be moved out of the housing.

The elements of memory metal can be heated indirectly and/or directly. In the case of indirect heating, the temperature of the memory metal is varied by changing the ambient temperature. In the case of direct heating, the memory metal is heated virtually on its own, for example by an electric current flowing through it. Depending on the mass of the memory metal, a specific quantity of electrical energy is required for making the temperature thereof rise within a relatively short time.

In one embodiment of the actuator according to the invention, the required energy supply to the element of memory metal is procured by the actuator comprising at least one rechargeable capacitor, with the electrical charge of which the element of memory metal can be activated. In a similar manner at least one further rechargeable capacitor is provided for activating the at least one element of memory metal of the locking means. The number of capacitors to be used depends, inter alia, on the required response time of the adjusting device, the available charge current for charging the capacitors and the number of elements which have to be activated.

As already indicated above, it is possible to intervene more rapidly with a fluid flow in a hydraulic and/or pneumatic system with the actuator according to the invention than with the aid of actuator operated by electromechanical converters, as described, for example, in "Toyota Electronic Modulated Suspension (TEMS) System for the 1983 Soarer" by Yuji Yokoya et al., "SAE Technical Paper Series", 8840341 "Society of Automotive Engineers, Inc." 1984.

In this publication an actuator for influencing the oil flow in a shock absorber for a car is indicated, which actuator consists of a rod-shaped control element which is driven by a direct current motor and a reduction gearing device and with which a system of channels, located in the shock absorbing oil can flow, can be shut off or opened. As a consequence of the electromechanically operated adjusted device employed, the response time with which the damping characteristics of the shock absorber can be influenced is relatively long, as a result of which optimum operation of the shock absorber cannot be achieved in those situations in which the degree of damping must be adjusted more rapidly than the actuator is able to follow.

In motor vehicles it is, for example important to realise as far as possible permanent contact of the wheels with the road on driving away, accelerating or suddenly braking sharply and when the motor vehicle tilts to the side. It is obvious that the nature of the road surface also plays an important role in the choice of the damping of the shock absorber; when the road surface is virtually level relatively little damping will be chosen, while when the road surface is poor and uneven the shock absorbers will be adjusted to give relatively substantial damping.

A further aim of the invention is, therefore, to provide a shock absorber which, in comparison with the above-mentioned known shock absorber having an electromechanically operated actuator, has a shorter response time and wider proportional adjustment possibilities than the known shock absorber indicated above which is driven by an electromechanically operated actuator.

The invention, therefore also relates to a shock absorber comprising a cylinder containing damping fluid, a piston with piston rod which is movable in the cylinder, at least one system of channels in which damping fluid can flow from the one to the other side of the piston and control means for influencing the fluid flow in the at least one system of channels, the control means comprising at least one actuator according to the invention as described above.

In comparison with the known shock absorber, the damping of which is controlled by means of an electromechanical converter, the shock absorber according to the invention has the further advantage that, as a consequence of the relatively simple construction and low production and material costs of the adjusting device according to the invention, the cost price can be lower than that of the known shock absorber. Since the dimensions of the actuator can be kept relatively small, the device can be incorporated in existing shock absorber designs without extra space having to be reserved for it or the external dimensions of the shock absorber increasing.

The use of a shock absorber fitted with the actuator according to the invention is, of course, not restricted to cars but can also be used for motor bikes trains, trams, aircraft, tanks, etc.

Although the use of the actuator according to the invention specifically for influencing fluid flows has been emphasized in the above, the device is not restricted to this use. In principle, the actuator can be employed wherever, a lockable, proportional relative movement of the actuating element relative to the housing, or vice versa, is required.

The actuator and shock absorber according to the invention are described in more detail below with the aid of the examples of the preferred embodiments shown in the figures, and further advantages and embodiments hereof being indicated.

DETAILED DESCRIPTION OF THE PREFERRED AND ALTERNATIVE EMBODIMENTS OF THE INVENTION

Figure 1:
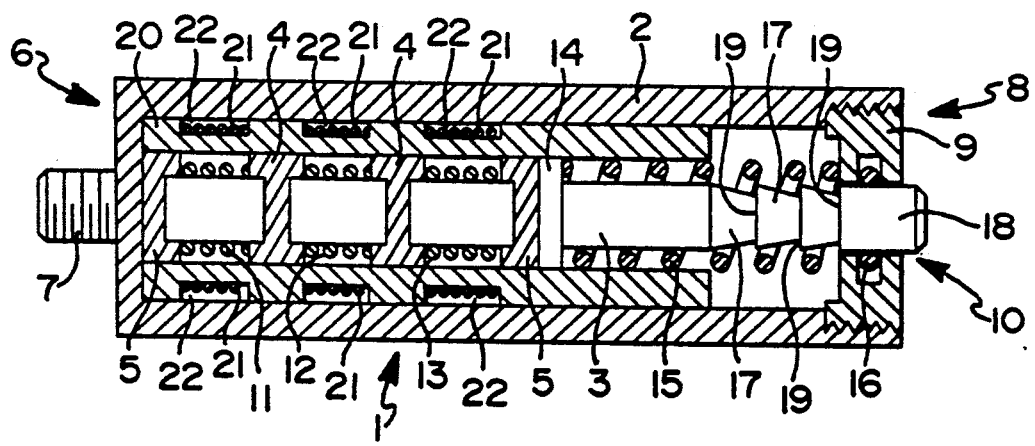
FIG. 1, shows a cross section of an embodiment of the actuator according to the invention, in the non-activated position.

The preferred embodiment of an actuator 1 according to the invention shown in FIG. 1 is constructed from an elongated cylindrical housing 2 in which an elongated rod-shaped actuating element 3 is supported movably by support elements 4, 5 which surround the actuating element 3. At a closed end 6, the housing 2 is provided with a screw thread end 7 for fastening thereof. At the opposite end 8, the housing 2 is open to receive the actuating element 3. The housing is provided here with an internal screw thread which corresponds to an external screw thread provided on a sleeve-shaped member 9. The sleeve-shaped member 9 comprises an opening 10 through which the actuating element 3 may be moved outside the housing.

In the housing there are incorporated three elements 11, 12, 13 of memory metal which are designed as compression springs and which surround the actuating element 3. The elements 11, 12, 13 arranged in cascade are separated from one another by the support elements 4, having an H-shaped cross section, and in which the support elements 5 with a U-shaped cross section are fitted at the ends of the cascade connection. The ends of the elements 11, 12, 13 are provided with spirally wound electrically conducting connection wires 21 for the activation thereof.

The actuating element 3 is provided with a stop 14, against which rests the support element 5 located at the end of the element 13. The elements 11, 12, 13 of memory metal, designed in the shape of compression springs, are preprogrammed in such a manner that, when heated above their transition temperature, they attempt to assume a predetermined longer length with respect to the situation illustrated in FIG. 1. Due to the expansion of one or more of the elements 11, 12, 13, a force is exerted on the stop 14 as a result of which the actuating element 3 is driven outside the housing. The distance over which the actuating element 3 projects outside the housing 2 is at its maximum when all the elements 11, 12, 13 are activated.

Between the sleeve-shaped member 9 fitted in the housing 2 and the stop 14 there is permanently resilient compression spring 15 which exerts a force on the actuating element in the direction opposite to the force exerted by the respective elements 11, 12, 13. When the activation of at least one of the elements 11, 12, 13 is removed, the actuating element 3 will be moved back into the housing as a result of the force of the compression spring 15, provided that the actuating element is not locked in a specific position.

Figure 2:
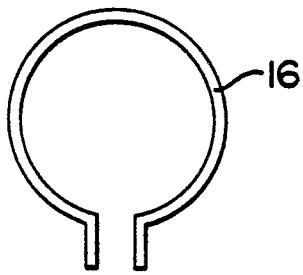
FIG. 2, shows, on an enlarged scale, the locking element of memory metal used in FIG. 1.

In order to lock the actuating element, loop-shaped element 16 of memory metal is incorporated in the sleeve-shaped member 9, which locking element is illustrated on a larger scale in FIG. 2. The loop-shaped element 16 is preprogrammed in a manner such that, when heated above its transition temperature, it attempts to assume a diameter which is greater than that of the actuating element 3. At the end extending outside the housing, the actuating element 3 is provided with tapering constrictions 17 with V-shaped cross section, in the direction outside the housing, corresponding in number with the number of elements 11, 12, 13 of memory metal and/or the desired number of positions in which the actuating element 3 and the housing 2 must mutually be able to be locked. At the end extending outside, the actuating element 3 is provided with a rounded-off cylindrical head 18.

When the actuating element 3 is moved outside the housing, it is automatically locked in a position, when the loop-shaped locking element 16 is not activated, as a result of which the locking element 16 rests against the plane edges 19 of the V-shaped constrictions 17 and the head 18 respectively. In the locked position, the actuating element 3 can only be moved further outside the housing. After removal of the activation of one or more of the elements 11, 12, 13 the actuating element 3 may be moved back into the housing 2 only by removing the locking, that is to say by activating the locking element 16, under the influence of the resilience of the compression spring 15.

In the preferred embodiment of the actuator according to the invention illustrated in FIG. 1, an electrically insulating cylindrical sleeve 20 with a annularly channeled outer circumference is fitted around the support elements 4, 5, supporting the actuating element 3, and the stop 14. This insulating sleeve 20 has slot-shaped passages, which are not shown, between the chambers 22 and the elements 11, 12, 13 or memory metal, as a result of which the connection wires 21 can follow the changes in length of the elements 11, 12, 13. The support elements 4, 5 and the stop 14 are movably inside the sleeve 20.

The elements 11, 12, 13 of memory metal and the locking element 15 of memory metal are, according to the invention, activated electrically by discharging hereover one or more capacitors (not shown). The switching of the capacitors for charging or for discharging hereof, respectively, can be realized with the aid of suitable semiconductor switches, such as transistors or thyristors. Instead of fixed electrically conducting connection wires 21, the elements 11, 12, 13 may also be activated by means of brushes (not shown). The capacity of the capacitors to be used is determined, inter alia, by the transition temperature of the memory metal used, the mass thereof to be heated and the desired response time.

Obviously, the actuator shown in FIG. 1 may be changed in a large number of ways without, however, departing from the principle and the scope of the invention. In this manner, the elements 11, 12, 13 of the memory metal designed as spiral compression springs can also be replaced by a single long compression spring, with branch connections for activation of the spring distributed over its length if necessary. Instead of spiral compression springs, use may also be made of cylindrically shaped springs and elements designed in the shape of a sleeve etc. Instead of the compression spring 15, in a similar manner to the elements 11, 12, 13, an element of memory metal may be used in order to move the actuating element 3 in the direction towards the housing. The actuator 1 may also be modified in a manner such that the movement provided by the elements of memory metal and the movement provided by the compression spring 15 act in a manner opposite to that shown in FIG. 1. The actuating element 3 is then moved out of the housing by the permanently resilient compression spring and can be moved in the direction towards the housing by activating the elements of memory metal. Obviously, use may be made of a combination of suitably fitted tension and compression springs, optionally of memory metal, or of a permanently resilient material in order to achieve a desired movement of the actuating element 3.

In addition, the locking provided by the locking element 16 can be realized in various ways. Instead of increasing the diameter by means of activation, the locking element 16 may also be programmed in a manner such that, when heated above its transition temperature, it attempts to assume a predetermined smaller diameter. Instead of V-shaped constrictions 17, the actuating element 3 can also be provided with differently shaped suitable notches for locking the actuating element in a specific position. The housing 2, the actuating element 3 and the supports 4, 5 may be made from metal, plastic and the like. The various components may be provided with electrically insulating casings in order to prevent undesired electrical connections arising between the housing and the elements 11, 12, 13 of memory metal and/or between these elements mutually.

Instead of cylindrical head 18, the actuating element 3 may be provided at the end extending towards the outside with other suitable means for influencing a fluid flow or operating a control element in a hydraulic and/or pneumatic assembly.

When it is the housing 2 and not the actuating element 3 which has to make a relative movement with respect to its environment, the head 18 of the actuating element may be provided with suitable means for the tight fastening thereof, for example a screw thread (not shown). Instead of, for example, the screw thread end 7, the housing 2 may then be provided with suitable means for influencing a fluid flow or control elements in hydraulic and/or pneumatic assemblies (not shown).

Figure 3:
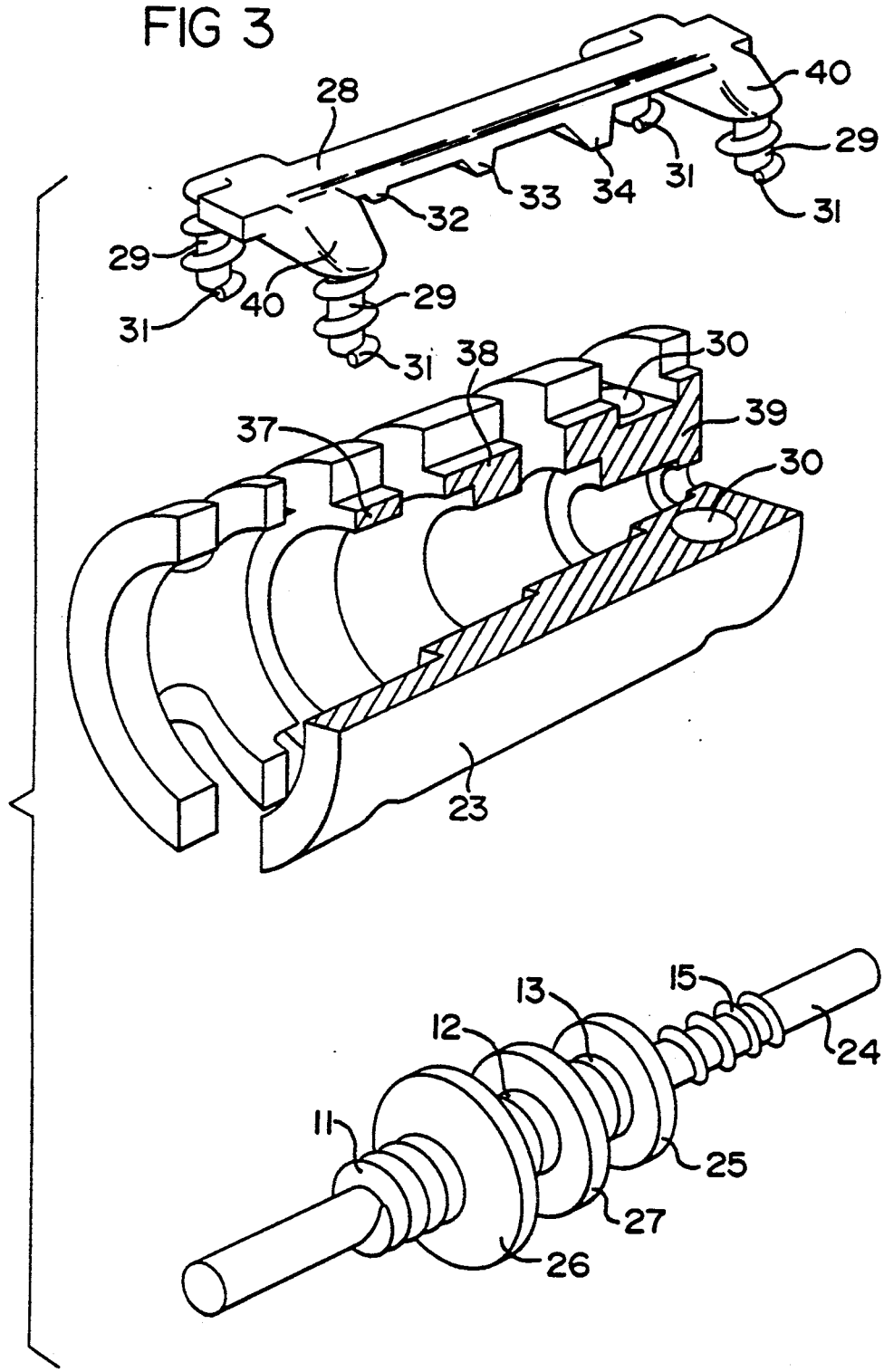
FIG. 3, shows, in perspective, with some parts in exploded view, a partially exposed alternative embodiment of the actuator according to the invention.

FIG. 3 shows in perspective, with some parts in exploded view, an alternative embodiment of the actuator according to the invention in which the elongated cylindrical housing 23 is cut away. The components corresponding to the embodiment illustrated in FIG. 1 are provided with the same reference numerals. In the lower half of FIG. 3, an elongated rod-shaped actuating element 24 is shown with a stop 25 permanently connected herewith. As shown, in a manner similar to that described for FIG. 1, around the actuating element 24 there are elements 11, 12, 13 of memory metal designed in the form of compression springs and the further element 15 of permanently resilient material designed as a compression spring. The elements 11, 12 and 13 are separated from one another by discs 26, 27. These discs 26, 27 are preferably made from electrically insulating material. The diameter of the discs decreases in the direction of the further element 15. The elements 11, 12, 13 of memory metal are provided with electrically conducting connection wires (not shown) for electrical activation thereof.

In the uppermost of FIG. 3 is shown an elongated locking element 28 for locking the actuating element in a specific position. This locking element 28 has, at its end, transverse arms 40. At the ends of these transverse arms 40 there are located at right angles thereto projecting pins 29, which pins 29 can be received in a movable manner in a correspondingly located openings 30 of the housing 23. Elements of memory metal 31 designed as a compression spring are fitted around the pins 29, which elements are programmed such that as a result of activation thereof by means of the electrically conducting connection wires (not shown) connected herewith, the locking element 28 can be moved radially with respect to the housing 23 in an outward direction. Although only one locking element 28 is shown in FIG. 3, in the assembled position the actuator has a similar further locking element provided opposite the locking element 28.

The locking element 28 is provided with trapezoid-shaped projections 32, 33, 34, the mutual distance of which corresponds to the mutual distance between the discs 26, 27 and the stop 25.

Figure 4:
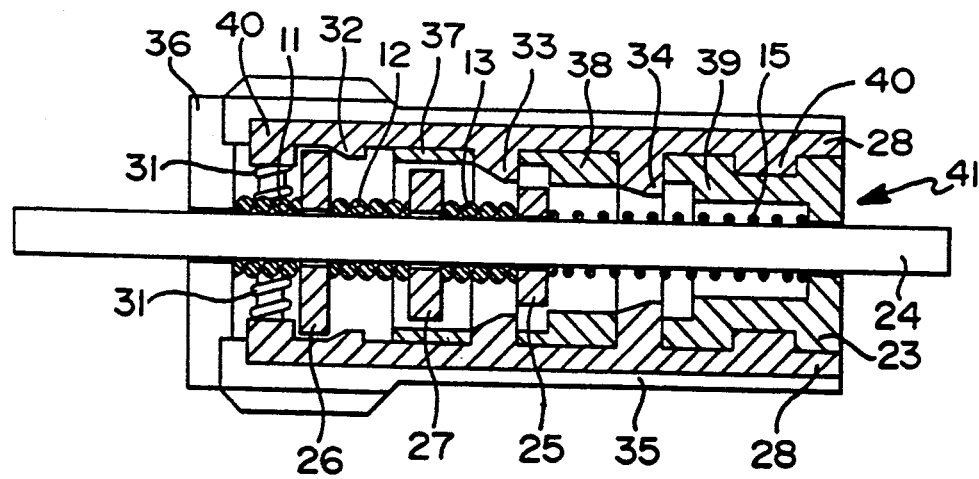
FIG. 4, shows a cross section of the assembled, complete actuator according to the embodiment shown in FIG. 3, in a non-activated position.

FIG. 4 shows a cross section of the complete assembled actuator according to the embodiment shown in FIG. 3, a cylindrical jacket 35 being fitted around the housing 23. The elements 11, 12, 13 and 31 of memory metal are not activated in this case. As already indicated, the actuator is provided with two locking elements 28 located opposite each other. At the end of the housing 23 where the element 11 of memory metal is located, the housing 23 is closed off by means of a cap 36 closing off the jacket 35. The cap 36 has in the centre an opening through which the actuating element 24 projects outside the housing 23, which opening also acts as a support for the actuating element. At the opposite end 41 of the housing 23, the actuating element 24 also projects, supported, towards the outside. The transverse arm 40 located in the left-hand half of the figure forms a stop for the disc 26.

By activating the element 11 of the memory metal, the actuating element 24 at the end 41 of the housing is moved further towards the outside. The disc 26 then runs along the oblique side of the trapezoid-shaped projection 32, as a result of which the two locking elements 28 are moved in an outward direction. When the disc 26 comes up against a stop 37 formed in the housing, and in the non-activated position of the elements 31 of memory metal, the two locking elements 28 will move towards the axis of the housing in a manner such that the disc 26 comes up against the straight side of the projections 32 so that the actuating element 24 is locked with respect to the housing 23 in this position. By activating the elements 31 of memory metal this locking can be removed by moving both locking elements 28 in an outward direction with respect to the housing 23. In a locked position, activation of the element 11 of memory metal may be removed without the mutual position of the actuating element 24 in the housing 23 changing.

From this locked position, the actuating element 24 can be moved further radially towards the outside and be locked in a similar manner by activation one or both of the elements 12, 13 of memory metal. The disc 27 and the stop 25 are limited in their direction of movement by the stops 38 and 39 respectively. If required, further permanent spring means can be supplied in order to provide a force on the locking elements 28 which is directed radially inwards with respect to the housing by means of, for example, providing the locking elements 28 with a slot incorporating a leaf spring which interacts with the jacket 35 or by means of fitting compression springs (not shown) between the locking element 28 and the jacket 35 etc. Instead of designing the elements 31 of memory metal in the form of compression springs, they may also be designed as tension springs programmed in a manner such that when activate in inward force is exerted on the locking elements 28 as a result of which the further spring means exert an outwardly directed force on the locking element 28.

As in the embodiment of the actuator according to the invention shown in FIG. 1, actuating element 24 and/or the housing 23 may be provided with suitable means for controlling fluid flows and the like. In order to prevent undesired electrical contact between the elements 11, 12, 13 and 31 of memory metal, the various components may be provided with an electrically insulating layer, or as many as possible thereof may be made from an electrically insulating material. If required, the actuator may be provided with suitable sealing means for fluids, for example the form of O- or V-rings (not shown) at the position where the actuating element 3, 24 can be moved out or into the housing 2, 23.

As already mentioned, the actuator according to the invention can be used with particular advantage for influencing the damping characteristics of a shock absorber for motor vehicles, rail vehicles, aircraft etc. because, as has become clear in the above, the actuator can be activated in a simple manner, can be locked in one or more positions, has a rapid response time and the dimensions of the actuator can be kept relatively small. As an illustration, a practical embodiment of the actuator according to FIG. 1 or 3 is 40 mm in length with a cross section of 15 mm, a path of approximately 10 mm in three steps of approximately 3 mm each with a force of movement of 2.5 kg and a holding force of 1 kg. The setting-up time per step is consequently exceptionally short and is approximately 30-50 msec.

Figure 5:
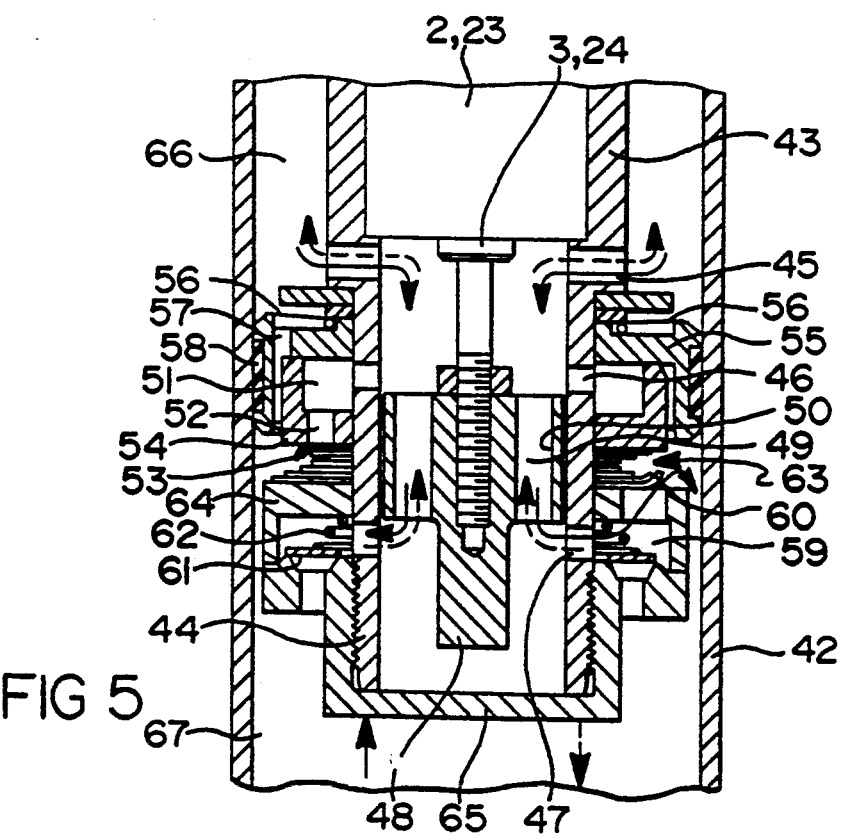
FIG. 5, shows diagrammatically the use of the actuator according to the invention in a shock absorber.

FIG. 5 shows an application of the actuator according to the invention in a shock absorber in which only the part being of interest for the invention is depicted in cross section. The shock absorber comprises a cylinder 42 with a shock absorber piston rod 43 and a piston connected thereto. A chassis or wheel suspension components of a vehicle may be fastened to the ends of the cylinder and the piston rod. In the cylinder piston assembly is a damping medium which is known per se. The actuator 2, 23 according to the invention is incorporated in the piston rod 43, a threaded end being attached to the actuating element 3, 23. The threaded end projects, via a sealing assembly, into a cylindrical sleeve 44 is provided with three sets of openings 45, 46 and 47 respectively. A disc 48 is fitted in sleeve 44 and is movable in an axial direction. The disc is provided with axial openings 49 through which the medium can flow unhindered. The disc 48 is connected with the threaded end of actuating element 3, 24. A wall 50 of the disc can, by movement thereof, come to lie in front of the openings 46 or the openings 47 or in front of none of these. The opening 46 is via a first chamber 51, connected with an opening 52 against which a spring-loaded one-way valve 53 lies. Opening 52 is provided in a body 54 on which a sealing body 55 rests. The latter is further provided with a one-way valve 56 which can open and close a channel 57. The body 55 forms, with a sealing element 58, the actual seal between the cylinder and the piston rod. The opening 47 is connected to a second chamber 59 which is provided with one-way valves 60 and 61 respectively. In this case, one-way valve 61 is loaded by a conical coil spring 62 while one-way valve 60 is loaded by a set of springs 63 in the rest position. The set of springs 63 is also used to push the one-way valve 53 back towards the starting position. A body 64 which limits the second chamber 59 is spaced from the shock absorber cylinder 42 in a manner such that damping medium can flow freely in-between. The sleeve 44 is limited on the underside by a floor 65.

The shock absorber operates as follows: In the uppermost position of the disc 48 shown in FIG. 5, the damping medium is moved from a chamber 66 to a chamber 67 when the shock absorber makes the outward movement, indicated by a solid arrow.

The medium consequently flows unhindered through the openings 45 to the inside of the piston rod 43. Because the wall 50 is in front of the openings 46, no medium can flow through. The one-way valve 56 also prevents the passage of the medium. The medium is, consequently forced to move via the opening 47 to the chamber 67 and, as result of this to pass through a system of channels, producing a damping. Having arrived in the second chamber 59, the one-way valve 61 hinders further flowing but the one-way valve 60, against the pressure of the set of springs 63, makes the outward flowing of the medium possible as is indicated with solid arrow. On the outward stroke, which is indicated by a dotted arrow, in which the medium must be moved from the chamber 67 to the chamber 66, the medium flows via a one-way valve 61, the opening 47, the opening 49 and the opening 45 to the chamber 66. The valve 56 needs such a great force to be opened that it remains closed in the position according to FIG. 5.

In the middle position in which the disc 48 does not close off any of the openings 45, 47, the damping medium flows, upon the outward movement, from the chamber 66 to the chamber 67, as a result of which this medium can flow not only in the manner described above via the openings 45, 49, 47, the second chamber 59 and the one-way valve 60 but, because the opening 46 is now open, can also flow via the chamber 51 and the one-way valve 53 to the chamber 67. Consequently, the damping is considerably smaller relative to the position depicted in FIG. 5.

In the lowest position of the disc 48, the opening 47 is closed off by the wall 50 of the disc 48. On the outward stroke of the piston, the medium flows from the chamber 66 to the chamber 67. Because the opening 47 is closed off, the flow via the one-way valve 60 is no longer possible. The medium can only flow outwards via the one-way valve 53. On the inward stroke of the shock absorber, the flow path via the one-way valve 61 is prevented by the closing off of the opening 47. The medium can only flow by opening of the valve 56 via the channel 57 to the chamber 66. The damping in both flow directions is very great.

The position of the disc 48 can be adjusted continuously to the temporary damping requirements with the aid of the actuator according to the invention. However, it is also possible to adjust a specific desired position by locking the actuating element in the manner described above. The control values for adjusting the damping characteristics of the shock absorber can be converted by a microprocessor, with the aid of acceleration detectors, inclination detectors etc. incorporated in a vehicle in question, into a command for activating one or more elements of memory metal of the actuator according to the invention or for locking the locking element in a specific position. Consequently an attempt is made in as many circumstances as possible to establish continuous road contact of the wheels of a car or another motor vehicle or, in the case of a rail vehicle, continuous contact of the wheels with the rails. The signals originating from the microprocessor are further translated in a separate processing circuit into control pulses for circuits which connect the respective capacitors with the elements of memory metal, for heating thereof, or with a supply source for charging up the relevant capacitors.

Figure 6:
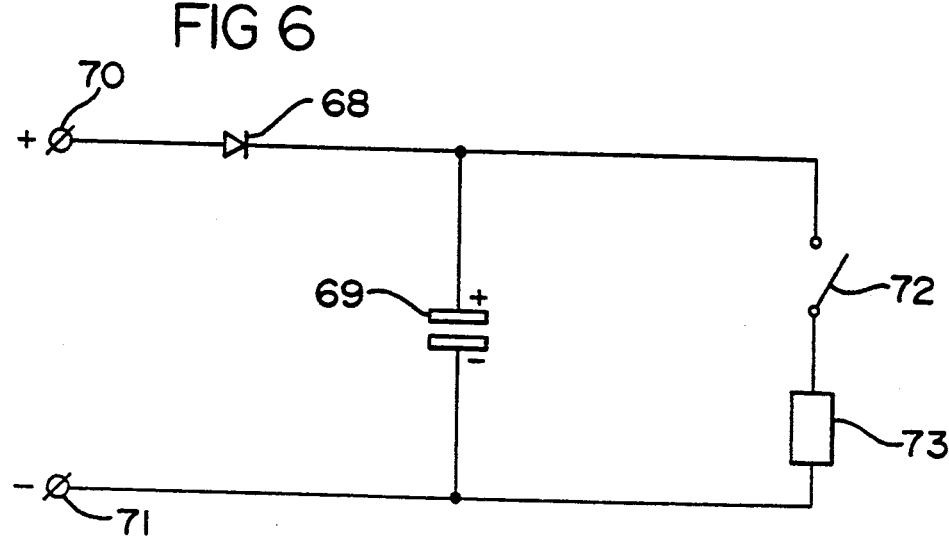
FIG. 6, shows an electrically layout for activating an element of memory metal.

FIG. 6 shows a block diagram for a capacitor control of this type. In its most simple form the circuit comprises a diode 68 with a capacitor 69 connected in series therewith. The anode of the diode 68 is connected to the positive supply connection point 70 and the earth electrode (−) of the capacitor is connected to the negative supply connection point 71. A series circuit consisting of a switch 72 and an element of memory metal 73 is connected in parallel to the capacitor 69.

When the switch 72 is in its non-conducting position, the capacitor 69 is charged up via the diode 68. By subsequently bringing the switch 72 into a conducting state, the energy stored up in the capacitor 69 is supplied to the element 73 of memory metal, which is consequently heated. When the switch 72 is subsequently returned again into its non-conducting position, the capacitor 69 will again be charged up and the cycle can be repeated.

On the other hand, when the switch 72 remains in its conducting position, a current will flow continuously via the diode 68 through the element 73 of memory metal, as a result of which this remains in its heated state.

By connecting several capacitors 69 in parallel, the energy supplied to the element 73 of memory metal when the switch 72 is conducting is correspondingly greater. Instead of the mechanical switch 72 shown in the drawing switching semiconductor components such as transistors, thyristors and so on may also obviously be used.

It is obvious that the application of the actuator according to the invention is not restricted to a shock absorber as illustrated in FIG. 5 but may be used in many types of shock absorbers known in the technology due to its small dimensions.

What is claimed is:

1. An actuator comprising a cylindrical housing with an elongated actuating element movably supported therein, and an element of memory metal engaging the actuating element, wherein the housing and the actuating element are movable relative to one another in response to activation of the element of memory metal, one end of said housing defining at least one opening through which the actuating element protrudes axially upon said relative movement, said actuator further comprising locking means operable to selectively engage the actuating element in response to an externally generated logic signal for mutually locking the actuating element and the housing in at least one position for proportionally positioning a regulating member of an associated control device.

2. The actuator according to claim 1, wherein the locking means comprise at least one additional element of memory metal, by activation of which the mutual locking of the actuating element and housing can be controlled.

3. The actuator according to claim 2, wherein the at least one additional element of memory metal comprises a locking element engaging the actuating element.

4. The actuator according to claim 3, wherein the at least one additional locking element comprises a loop of memory metal surrounding the actuating element, such that on heating above a characteristic transition temperature, said loop attempts to transition towards a predetermined diameter.

5. The actuator according to claim 4, wherein the actuating element defines at least one notch in which the at least one locking element selectively engages.

6. The actuator according claim 5, wherein the at least one notch is formed by a V-shaped tapered constriction over a portion of the axial length of the actuating element.

7. The actuator according to claim 3, wherein a sleeve shaped member is fitted in the at least one opening of the housing through which the actuating element projects outwardly, in which the at least one locking element is carried.

8. The actuator according to claim 7, wherein the sleeve shaped member and the housing are provided with mutually engaging screw threads for detachably mounting the sleeve shaped element.

9. The actuator according to claim 2, wherein the at least one additional element of memory metal is constructed as an element with a spring action coacting with a further locking element of the locking means whereby the further locking element is controlled by activation of said additional memory element.

10. The actuator according to claim 9, wherein the further locking element comprises at least one elongated body having projections protruding into the housing, onto which body several spring elements of memory metal, grip for moving the body in the radial direction of the housing to effect locking of the actuating element in a specific position by means of the said projections and mating disc-shaped elements carried by the actuating element, which grip said projections.

11. The actuator according to claim 1, wherein the element of memory metal is configured as a plurality of springs connected in a cascade and arranged for independent actuation.

12. The actuator according to claim 1, further comprising at least one further element of permanently resilient material engaging the actuating element and under the influence of which the housing and the actuating element are biased relative to one another in a direction opposite to the relative direction of movement provided by the at least one element of memory metal, which at least one element is designed as a compression spring.

13. The actuator according to claim 1, wherein the end of the actuating element merging from the housing defines attachment means engaging said regulating member.

14. The actuator according to claim 1, wherein said control device comprises a fluid flow control valve disposed substantially within the housing.

15. The adjusting device according to claim 1, wherein at least one rechargeable capacitor is disposed in-circuit with the element of memory metal and a source of electrical current to activate said memory metal.

16. A shock absorber comprising a cylinder containing damping fluid, a piston with piston rod which is movable in the cylinder, at least one system of channels in which damping fluid can flow from the one to the other side of the piston and control means for influencing the fluid flow in the at least one system of channels, the control means comprising at least one actuator comprising a cylindrical housing with an elongated actuating element movably supported therein, and an element of memory metal engaging the actuating element, wherein the housing and the actuating element are movable relative to one another in response to activation of the element of memory metal, one end of said housing defining at least one opening through which the actuating element protrudes axially upon said relative movement, said actuator further comprising locking means operable to selectively engage the actuating element in response to an externally generated logic signal for mutually locking the actuating element and the housing in at least one position.

17. The shock absorber according to claim 16, wherein the at least one actuator for assuming several positions which may be locked is arranged for stepwise adjustment of damping action of the shock absorber.

18. An actuator comprising:
a cylindrical housing;
an elongated actuating element supported for relative axial movement within said housing and extending therefrom to position a regulating member of an associated control device;
a memory metal element operatively engaging said actuating element within said housing and responsive to controlled thermal activation thereof to axially position said actuating element between end limits of travel; and
locking means operable to selectively interlock said actuating element and said housing in a plurality of axially spaced predetermined positions intermediate said end limits of travel.

19. The actuator of claim 18, further comprising means operative to liberate heat in the proximity of said memory metal element in response to a flow of electrical control current to effect said thermal actuation.

20. The actuator of claim 18, wherein said locking means comprises at least one recess formed in said actuating element and a second memory metal element carried with said housing operative to radially inwardly extend catch means within said recess to effect said interlock.

* * * * *